Feb. 9, 1926.

H. E. BAUGHMAN

BRAKE FOR AIRPLANES

Filed Nov. 14, 1925

Inventor

Harold E. Baughman,

By Gross & Collings

Attorneys

Feb. 9, 1926.
H. E. BAUGHMAN
1,572,834
BRAKE FOR AIRPLANES
Filed Nov. 14, 1925
2 Sheets-Sheet 2
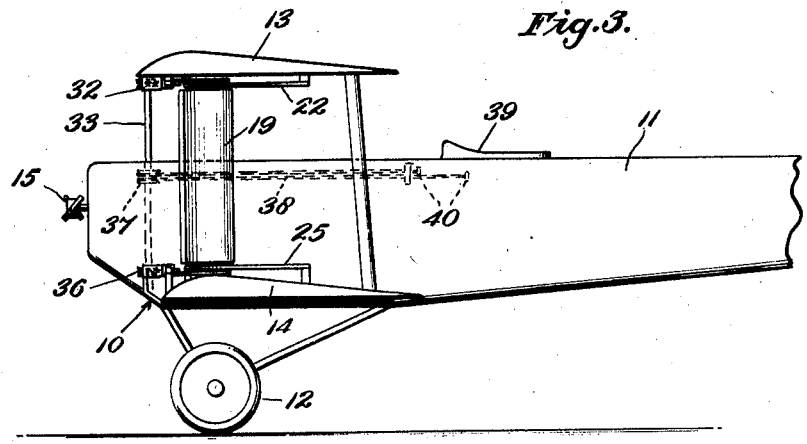
Fig.3.
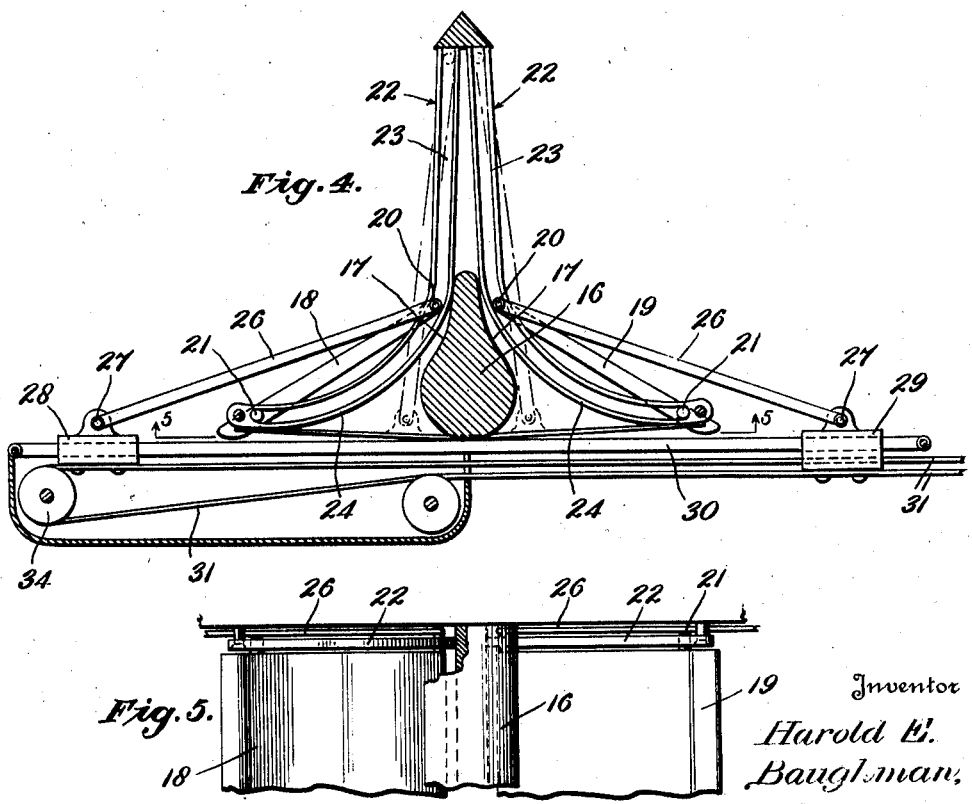
Fig.4.
Fig.5.
Inventor
Harold E.
Baughman,
By Grosse Collings
Attorneys Patented Feb. 9, 1926.

1,572,834

UNITED STATES PATENT OFFICE.

HAROLD E. BAUGHMAN, OF WATERLOO, IOWA.

BRAKE FOR AIRPLANES.

Application filed November 14, 1925. Serial No. 69,043.

*To all whom it may concern:*

Be it known that I, HAROLD E. BAUGHMAN, a citizen of the United States, residing at Waterloo, in the county of Black Hawk and State of Iowa, have invented certain new and useful Improvements in Brakes for Airplanes, of which the following is a specification.

This invention relates to brakes for airplanes and has for one of its objects to provide a device of this character which will be simple in construction, comparatively inexpensive to manufacture and install, and more efficient in use than those which have been heretofore proposed.

A further object of the invention is to provide an airplane brake which is comparatively light in weight and so compact that when closed or in the inoperative position, it will not create an excessive amount of air resistance.

With the above and other objects in view, which will appear as the description proceeds, the invention consists in the novel details of construction and combinations and arrangements of parts, more fully hereinafter described and particularly pointed out in the appended claims.

Referring to the accompanying drawings, forming a part of this specification, in which like reference characters designate like parts in all the views;

Fig. 3 is a side elevational view of the parts shown in Fig. 1, as seen from the right of the said figure;

Fig. 4, is an enlarged horizontal sectional plan view showing one of the braking mechanism in detail; and, Fig. 5 is an enlarged fragmentary elevational view of a portion of the parts shown in Fig. 4, as viewed from the plane indicated by the line 5—5 of the said figure.

Figure 1:
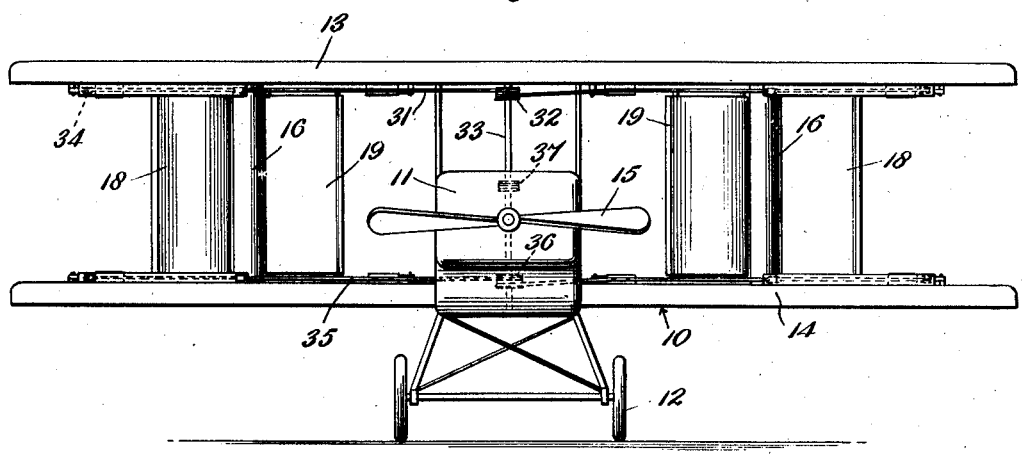
Fig. 1 is a front elevational view of a conventional form of biplane, showing a brake constructed in accordance with the present invention, in operative position thereon.

Referring more particularly to the said drawings, the numeral 10 indicates generally, an airplane of the well known biplane type provided with the usual fuselage 11, landing gear 12, upper wing 13, lower wing 14, and propeller 15, driven by any suitable source of power not shown. The braking mechanism constituting the present invention comprises two units, which in the biplane type of machine are mounted between the upper and lower wings 13 and 14, one on either side of the fuselage 11. Since these units are substantially duplicates of one another, only one will be described in detail.

In applying the braking mechanism of the present invention to an airplane, two of the ordinary front wing struts are replaced by masterstruts, such as 16, which are larger and more securely anchored to the wings than is the general practice, in order to better resist the strains to which they will be subjected during the action of the brake. These struts 16 are preferably formed with a cross section, substantially as shown in the drawings, with their rear portions reduced or hollowed out as at 17, to accommodate the forward edges of the brake wings, to be more fully described below, when the latter are in their inoperative positions to the end that the air resistance of the brake, when in this position will be reduced to a minimum. The brake proper, comprises a pair of substantially rectangular aerofoils or brake wings 18 and 19, which are vertically mounted between the upper and lower wings 13 and 14 of the plane. The upper edges of the said aerofoils are provided with the pins or projections 20 and 21, slidably mounted in suitable guides 22, which are secured in any desired manner, beneath the upper wing 13. The said guides as will be best understood from Figs. 2 and 4, are arranged in pairs, one to either side of the master strut 16 and comprise rearwardly extending straight portions 23 which converge slightly toward the rear, and forward curved portions 24 which extend at substantially right angles to either side of the said strut 16.

The lower edges of the aerofoils 18 and 19 are provided with similar pins or projections which are slidably mounted in complementary guides or tracks 25 which are suitably secured to the lower wing 14 of the machine.

In order that the aerofoils 18 and 19 may be moved from their rearward folded or inoperative position to the forward operative position, shown in full lines in Fig. 4, I provide the links 26, one of the ends of which is pivotally connected to the pin 20 of each aerofoil, while the other ends of the said links are pivotally connected as at 27, to the sliding blocks 28 and 29, slidably mounted upon a suitable guide member or rod 30. These blocks 28 and 29 are secured to a cable 31 which serves to simultaneously move them in opposite directions, as will now be explained.

Figure 2:
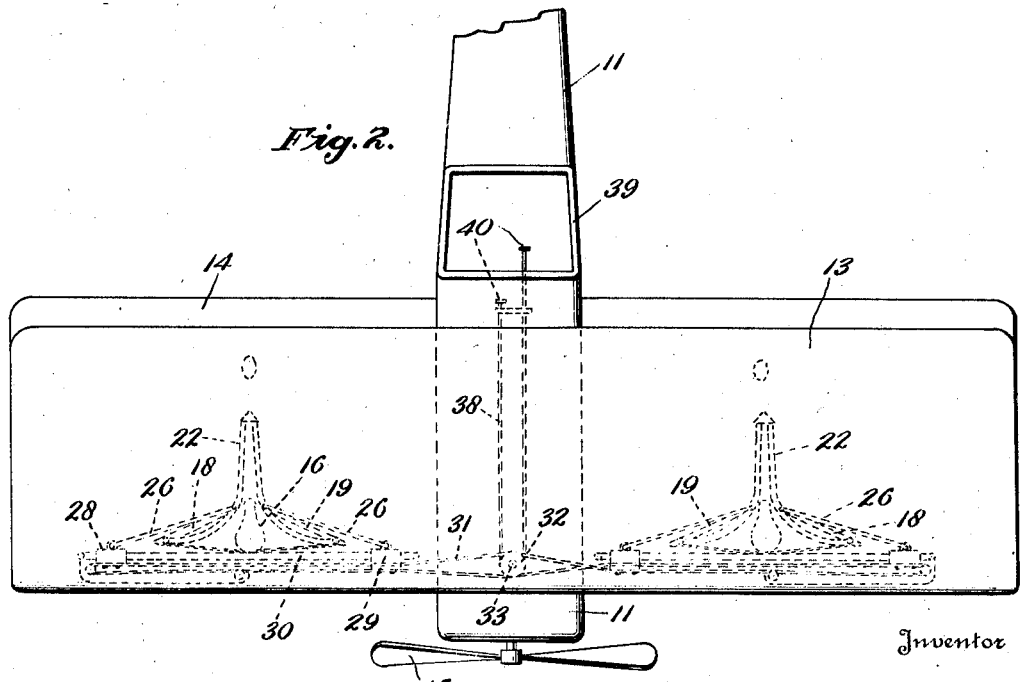
Fig. 2 is a top plan view of the parts shown in Fig. 1.

The cable 31 is an endless one which passes around a pulley or drum 32 rigidly carried by a vertically journalled shaft 33 arranged in the forward end of the fuselage 11, as will be clear from Figs. 1, 2 and 3. The said cable extends along beneath the forward edge of the upper wing 13, to an idler pulley 34 about which it passes and then returns to the drum 32. The sliding block 28 is secured in any suitable manner to the rear run of the cable, while the block 29 is likewise secured to the forward run of the said cable so that upon any movement of the cable in either direction, the said blocks will be moved in opposite directions, as will be readily understood from Fig. 4. The movements of these blocks will, of course, through the rings 26, produce corresponding movements of the aerofoils 18 and 19, connected thereto, so that they will be moved from operative to inoperative positions, and vice versa, according to the movements of the cable 31.

A similar cable 35 is similarly attached to the lower portion of the aerofoils 18 and 19, through corresponding blocks and links and passes around a drum 36, carried by the lower end of the shaft 33. The said shaft 33 also carries intermediate the drums 32 and 36, another drum or pulley 37 around which passes an operating cable 38, which extends backward in the fuselage, to the cockpit 39, where it is provided with suitable terminals 40, by means of which it may be manually operated by the aviator to actuate the braking aerofoils 18 and 19 as above described.

It will thus be seen that this invention provides a simple and effective brake for airplanes, which may be easily controlled by the aviator from the cockpit or from the side of the fuselage of the machine, to the end that the speed of the plane may be quickly checked when desired, thus facilitating landing in small fields and on rough or boggy ground, and the landing of seaplanes on the decks of ships since the speed of the plane may be quickly checked before and during the landing process. Furthermore the nose of the plane will not tip or dive, nor will the machine change its horizontal position during landing if equipped with this brake. It will also be noted that owing to the peculiar arrangement of the parts, when the aerofoils are in their operative positions, they occupy planes at an angle to the direction of the wind against them, from which it results that when once set in these positions, it is not necessary for the aviator to hold them in such positions as the force of the wind itself, will accomplish this result.

While the invention has been illustrated and described, as applied to an airplane of the biplane type, it may obviously, with slight modifications, be accommodated to monoplanes and triplanes. It will, therefore, be apparent that those skilled in the art may vary the details of construction as well as the precise arrangements of parts without departing from the spirit of the invention and, it is not wished to be limited to the above disclosure except as may be required by the claims.

What is claimed is:

1. In an airplane, a strut member, the rear portions of which are cut away; aerofoils normally positioned behind said strut member in planes substantially parallel to the path of wind travel with their forward portions in the cut away portions of said strut, said aerofoils being movable therefrom to positions at the sides of said strut at a substantial angle to said path of travel; and means for moving said aerofoils.

2. A brake for aircraft comprising aerofoils adapted to normally occupy positions substantially parallel to the path of wind travel; guides disposed above and below and defining the path of movement of said aerofoils; projections carried by said aerofoils slidably engaging said guides; and means for moving said aerofoils in said guides whereby they may be caused to occupy positions at substantial angles to said path of travel.

3. A brake for aircraft comprising a plurality of aerofoils; guides for said aerofoils having straight and curved portions, said straight portions being adapted to dispose said aerofoils substantially parallel to the path of wind travel, and said curved portions serving to dispose said aerofoils at substantial angles to said path of travel; and means for moving said aerofoils from one portion of said guides to the other.

4. A brake for aircraft comprising a pair of substantially vertical aerofoils; guides for said aerofoils having straight and curved portions, said straight portions being adapted to dispose said aerofoils substantially parallel to the path of wind travel, and said curved portions serving to dispose said aerofoils at substantial angles to said path of travel; and means for simultaneously moving said aerofoils in said guides from one position to the other.

5. A brake for aircraft comprising a pair of substantially vertical aerofoils; upper and lower pairs of guides for said aerofoils, having substantially parallel straight portions and oppositely disposed curved portions, said straight portions being adapted to dispose said aerofoils substantially parallel to the path of wind travel, and said curved portions serving to dispose said aerofoils at substantial angles to said path of travel; and means for simultaneously moving said aerofoils in said guides from one position to the other.

6. A brake for aircraft comprising a pair of substantially vertical aerofoils; upper and lower pairs of guides for said aerofoils, having substantially parallel straight portions and oppositely disposed curved portions, said straight portions being adapted to dispose said aerofoils substantially parallel to the path of wind travel, and said curved portions serving to dispose said aerofoils at substantial angles to said path of travel; an endless cable; connections between said aerofoils and opposite runs of said cable; and means for moving said cable.

7. A brake for aircraft comprising a pair of substantially vertical aerofoils; upper and lower pairs of guides for said aerofoils, having substantially parallel straight portions and oppositely disposed curved portions, said straight portions being adapted to dispose said aerofoils substantially parallel to the path of wind travel, and said curved portions serving to dispose said aerofoils at substantial angles to said path of travel; an endless cable; a guide rod; a pair of blocks slidably mounted on said guide rod, each of which is connected to an opposite run of said cable; links connecting said blocks and aerofoils; and means for moving said cable.

In testimony whereof I affix my signature.

HAROLD E. BAUGHMAN.